Patented Mar. 9, 1954

2,671,799

UNITED STATES PATENT OFFICE 2,671,799

PERHALOCARBON COMPOUNDS AND METHOD OF PREPARING THEM

William T. Miller, Ithaca, N. Y.

No Drawing. Application August 30, 1950, Serial No. 182,423

22 Claims. (Cl. 260—465.7)

This invention relates to perhalocarbon compounds and the method of preparing them. In one aspect, the invention relates to the production of functional derivatives of unsaturated perhalocarbons. In another more particular aspect, the invention relates to the production of perhaloallyl functional derivatives of unsaturated perfluorocarbons by intermolecular replacements of allylic halogens. This invention is a continuation-in-part of my prior and co-pending application Serial No. 601,387, filed June 25, 1945, now abandoned.

It has been found that perhalocarbon compounds and their derivatives are of value in various industrial applications such as protective coating compositions, electrical insulation, dielectrics, lubrication, refrigeration and the like. Typical of these perhalocarbons are the perfluorocarbons and chloro-derivatives of perfluorocarbon compounds, which may be prepared by the dimerization and addition reactions of fluorine with mono- and di-olefins, by methods such as thermal reactions of perhaloolefins or by other methods. The principal type products obtained from reaction between fluorine and perhaloethylenes are the simple or normal addition product and the dimer addition product. The dimerization reaction is important in that it leads to the formation of higher molecular weight compounds from low molecular weight olefins. An example of such reaction, is the fluorination of difluorodichloroethylene at a temperature between about —70° C. and about —75° C. to give a 40% yield of the dimer addition products ($C_4Cl_4F_6$ or $CF_2ClCFClCFClCF_2Cl$) 1,2,3,4-tetrachloroperfluorobutane. By-products from this fluorination reaction of $$CFCl=CFCl$$

are mainly butanes containing up to 6 chlorine atoms and ethanes containing from 1 to 4 chlorine atoms. Nearly quantitative conversion of the dimer $C_4Cl_4F_6$ into perfluorobutadiene-1,3 has been accomplished by dechlorination with zinc dust under improved conditions for isolation and recovery of the product. Perfluorobutadiene and the perfluorochlorobutadienes prepared in this way may be converted into a variety of perfluoro products by fluorination and polymerization procedures. Dechlorination of the dimer addition product of $CFCl=CFCl$ ($CF_2ClCFClCFClCF_2Cl$) with zinc dust and dioxane solution may be carried out so as to give substantial yields of 1,4-dichloroperfluorobutene-2 ($CF_2ClCF=CFCF_2Cl$) along with perfluorobutadiene-1,3.

Using a Pyrex reactor tube 1″ in diameter heated over a 1′ section to a maximum temperature of 550–560° C., trifluorochloroethylene passing through this reactor at the rate of 30–40 grams per hour reacts to give the following approximate amounts of principal products:

| | |
|---|---|
| $CFCl_2—CF=CF_2$ | 15–25% ⎫ 30% |
| $CF_2Cl—CF=CF_2$ | 5–10% ⎭ |
| $CF_2Cl—CFCl—CF=CF_2$ | 35% ⎫ 65% |
| $CF_2—CFCl—CFCl—CF_2$ | 30% ⎭ |
| High boiling residues | 5% |

In other experiments the ratio of propenes obtained was approximately one to one.

For example, $CF_2=CFCl$ passed at a 45 g./hr. rate through each of six 3 x 30 cm. Pyrex glass reactor tubes of a small scale pilot plant reacted when heated to 550–560° C. for 15 seconds to give the following approximate yields of major products:

| | |
|---|---|
| $CF_2=CF—CF_2Cl$ | 10% ⎫ 20% |
| $CF_2=CF—CFCl_2$ | 10% ⎭ |
| $CF_2—CFCl—CFCl—CF_2$ | 34% |
| $CF_2=CF—CFCl—CF_2Cl$ | 30% |
| Higher B. P. residue | 5% |
| Lower B. P. by-products | 11% |

These average results were obtained from a total pass of about 20 kilograms of $CF_2=CFCl$ in three units with an average conversion of about 70%. At higher temperatures the proportion of propenes in the reaction product is increased.

It will be noted that among the olefinic compounds prepared by the above methods, are those which contain allylic halogen, that is, a halogen atom which is bonded to a carbon atom adjacent to a doubly bonded carbon atom, as exemplified by the compound $CF_2=CFCF_2Cl$ in which the chlorine atom is referred to as the allylic chlorine, and is more reactive than the fluorine atoms attached to the same carbon atom. In perfluoro unsaturated compounds, allylic fluorine atoms are also more reactive than the fluorine atoms in the corresponding saturated compound.

It is, therefore, an object of the present invention to produce functional derivatives of unsaturated perhalo compounds.

Another object of the invention is to produce functional derivatives of unsaturated perhalo compounds by a method of intermolecular replacement.

Other objects and advantages of the invention will become apparent from the following more detailed disclosure.

It has now been found, as more fully hereinafter described, that it is possible to bring about selective reaction between the allylic halogen and reagents comprising inorganic metal compounds, to produce a new class of compounds comprising perhaloallyl functional derivatives by intermolecular replacement of the allylic halogen with an ion of inorganic metal compounds, in which the compounds produced are of primary importance in providing valuable new intermediates for polymer coatings, plastic compositions and the like, or as insecticides and other new chemical compositions. The functional derivatives of unsaturated perhalocarbons produced by the method of this invention are particularly useful as synthetic intermediates for the production of other perhalocarbon derivatives of relatively low molecular weight and as monomers for polymerization to form materials of relatively high molecular weight which are useful as lubricants, coating compositions and the like.

A general basis for the preparation of many derivatives of fluorocarbons results from this discovery that primary allylic chlorine in perfluoroolefins is highly reactive with a variety of reagents. For example, the chlorine in such compounds as $CF_2=CFCF_2Cl$ (3-chloroperfluoropropene-1) reacts in a highly preferential manner as compared with the fluorine atoms attached to the same carbon atom.

According to this invention, in its broad aspect, unsaturated perhalocarbons having at least 3 carbon atoms per molecule and an allylic halogen atom, are subjected to allylic replacements by reaction with inorganic metal compounds, which are normally metal salts such as cyanides, thiocyanates, sulfides, iodides, nitrates, nitrites, metal alcoholates, metal phenolates, metal salts of mercaptans, and thiophenols to replace the more reactive allylic halogen with the negative ion of the inorganic metal compound and to produce the desired perhaloallyl functional derivative of the unsaturated perhalocarbon. The replacement reaction is preferably made to take place with chlorine being present as the allylic halogen in perfluorochloroolefins, as exemplified by chlorine in the 3-position in $CF_2=CFCF_2Cl$ (3-chloroperfluoropropene-1) or in $$CF_2=CClCF_2Cl$$

(2,3-dichloroperfluoropropene-1), because of the lower cost of chlorine compounds as compared to the bromides and iodides, although the allylic halogen may also be either bromine or iodine. Thus bromine or iodine may appear as allylic halogen in such compounds as $CF_2=CFCF_2Br$ (3-bromoperfluoropropene-1) and $CF_2=CFCF_2I$ (3-iodoperfluoropropene-1), respectively. The replacement reaction may also be made to take place with secondary allylic halogens being present in perfluoroolefins, as illustrated by chlorine in the 3-position in 3,4-dichloroperfluorobutene-1 ($CF_2=CFCFClCF_2Cl$), although such secondary allylic groupings may be somewhat less reactive than the primary allylic groupings indicated above.

In carrying out the replacement reaction between the unsaturated perhalocarbon and the inorganic metal compound, the reactants may be employed over a wide range of concentrations depending upon the particular reaction being carried out. In general, with neutral salts such as sodium iodide, it is preferable to utilize a considerable excess of the salt in order to obtain a faster and more complete reaction. However, with bases or substances which give basic reactions in solution, it is frequently preferable to utilize an excess of the perhaloallyl halide or equivalent quantities and to add the metal compound to the allyl halide at a rate comparable to or less than the rate of reaction so as to maintain the halide in excess and avoid the presence at any time of appreciable concentrations of the base. This is especially important when alcohols are utilized as solvents because of the base catalyzed addition of alcohols to perhaloolefins which may occur. Primary alcohols undergo addition most readily so that secondary or tertiary alcohols as isopropyl and tertiary butyl alcohol are frequently preferred as solvents. Other solvents such as acetone, methyl ethyl ketone, diethyl ketone, dioxane and other ketones and ethers may also be utilized. The salt product of the reaction should be as sparingly soluble as possible. Where the reactant salt solution is added to the olefin gradually, this may be done by continuous extraction of the reactant salt with a relatively poor solvent. While the solvent employed is one which is preferably in a non-aqueous condition, it is nevertheless preferred that this solvent be soluble in water and water or aqueous solvents may be used to advantage in certain cases such as when no non-aqueous solvent can be found to dissolve the reactant salt. In general, the proper quantity of solvent employed will be that amount which is necessary to dissolve the required mol weight of the inorganic metal compound in the solvent. However, satisfactory reactions may be carried out utilizing sparingly soluble salts with an excess of the salt present so as to maintain at all times a saturated solution, even though a molar quantity of the salt will not dissolve initially. The salt formed by the reaction should be less soluble than the reactant salt. The ratio of solubilities should be as great as possible. For this reason allyl chlorides are frequently preferred to iodides and bromides.

The reaction between the unsaturated perhalocarbon, containing the allylic halogen, and the inorganic metal compound is carried out in a suitable mixing vessel with sufficient stirring to insure thorough mixing, so that the allylic halogen to be replaced will be obtained in the form of a fine powdered precipitated salt of the inorganic metal compound. The reaction is carried out at atmospheric pressure and at a temperature between about −10° C. and about 200° C., with a temperature between about 5° C. and about 100° C. being preferred. Complete admixture and reaction between the inorganic metal compound and the unsaturated perhalocarbon starting material is indicated either by examination of the boiling point at reflux, or by the quantity of precipitated salt, or by failure of additional salt to precipitate or by other methods for determining the composition of the reaction mixture.

Following the aforementioned complete admixture and reaction, there is obtained a mixture comprising the desired product, namely, the functional derivative of the unsaturated perhalocarbon in the solvent and containing an excess of the inorganic metal compound, as for example in the case of neutral salts where so used, and also the aforementioned precipitate comprising the metallic allylic halogen salt. This mixture is, in general, next filtered to separate the solid metallic allylic halogen salt from the filtrate comprising the desired perhaloallyl functional derivative product in solvent and excess inorganic metal salt. This filtrate may also contain some unreacted unsaturated perhalocarbon starting material. The isolation of the products may also be carried out by direct distillation after separation of precipitated salt by filtration, or by direct distillation without filtration, depending upon the particular products and the solvent which are present, the boiling points and stability of the products.

The filtrate thus obtained is next water-washed at room temperature with a quantity of water sufficient to dissolve the solvent and excess inorganic metal compound present. The resulting water-washed filtrate is then subjected to phase separation to obtain an aqueous phase comprising an aqueous solution of the solvent and inorganic metal compound, and a non-aqueous or organic phase comprising the desired end-product and any unreacted quantities of the original unsaturated perhalocarbon starting material. In order to separate any quantities of the solvent that may remain in the organic product phase thus separated, it is desirable to wash this phase several times with water, or in some instances when a ketone solvent which forms an addition compound with sodium bisulfite is utilized, a fairly concentrated solution of aqueous sodium bisulfite, having a concentration of at least 20% may be employed. Such procedure is of use for certain ketones where the products do not react with the bisulfite. It is also possible, if so desired, to separate any unused portion of the solvent that may remain in the aforementioned organic phase by direct distillation or drying.

The following examples will serve to illustrate some of the types of the functional derivatives of unsaturated perhalocarbons obtainable and the method of preparing them according to the present invention.

*Example I*

A one liter three-necked glass flask was fitted with a dropping funnel, a Herschberg-type stirrer with a gas-tight shaft seal, and a short packed distilling column surmounted by a refrigerated reflux condenser. One-tenth liter of pure anhydrous methyl alcohol was placed in the flask, cooled to ice temperature, the stirrer started and the flask swept out with dry nitrogen. 119 grams of perfluoroallyl chloride ($CF_2$=$CFCF_2Cl$) was then added. 11.5 grams of clean sodium metal was dissolved in 0.230 liters of anhydrous methyl alcohol and the resulting solution placed in the dropping funnel and slowly added to the stirred alcohol perfluoroallyl chloride mixture during a period of about three hours. Heat was evolved and the flask was cooled externally so as to maintain the contents under 9° C. At the end of the reaction the flask contents were found to be neutral to litmus. Distillation yielded a low boiling fraction, boiling largely at 34° C. This fraction was treated with anhydrous calcium chloride and then distilled from $P_2O_5$, after filtration to remove the calcium chloride, to yield approximately 70% of the theoretical yield of 3-methoxyperfluoropropene ($CF_2$=$CFCF_2OCH_3$). The 3-methoxyperfluoropropene had the following properties: B. P. 38.5° C., uncorrected; $D_4^{20}$ 1.358; $n_D^{20}$ 1.296; F. P. below Dry Ice temperature; molecular weight found 161, as compared with a calculated value of 162.

3-methoxyperfluoropropene

was unsaturated to potassium permanganate in acetone, and yielded a dibromide on bromination in a sealed tube.

*Example II*

A one liter three-necked glass flask was fitted with a gas inlet tube and a thermometer, which extended well into the flask, a stirrer with a gas-tight shaft seal and a water-cooled reflux condenser which was surmounted by a Dry-Ice cooled reflux condenser. 200 grams of powdered sodium iodide was placed in the flask and one-half liter of pure redistilled methyl ethyl ketone added. The stirrer was started and the flask and condensing system swept out with dry carbon dioxide gas. A carbon dioxide blanket was maintained at the condenser outlet during the reaction period and the reaction flask was protected from strong light. 161 grams of 3-chloroperfluoropropene ($CF_2$=$CFCF_2Cl$) was distilled into the reaction flask through the gas inlet tube and the mixture stirred for three hours. The flask contents were then heated to gentle reflux by means of an oil bath with stirring maintained for the duration of the run or about 100 hours. During this period the reflux temperature rose from about 34° C. to about 60° C. and the perfluoroallyl contents gradually turned orange-brown in color. Sodium chloride was precipitated.

The desired reaction product, perfluoroallyl iodide ($CF_2$=$CFCF_2I$), was separated from the reaction reflux by direct distillation and a crude product of 121 grams, B. P. 20° C. to 60° C. but largely boiling at 51° C. to 55° C., collected. Redistillation through an efficient column yielded pure perfluoroallyl iodide, B. P. 53.4° C. (uncorrected); $D_4^{20}$ 2.109; $n_D^{20}$ 1.389 and freezing below Dry-Ice temperature.

*Example III*

A one liter three-necked flask was fitted with a dropping funnel, a Herschberg-type stirrer with a shaft seal and an ice-cooled reflux condenser. 50 grams of powdered sodium cyanide, 45 cc. of water and 5 cc. of pyridine were placed in the flask and warmed gently with stirring until the cyanide was dissolved. The air was displaced from the flask with nitrogen and 85 grams of 3-chloroperfluoropropene ($CF_2$=$CFCF_2Cl$), dissolved in 100 cc. of anhydrous tertiary butyl alcohol, added very slowly with stirring while maintaining the reaction mixture at gentle reflux by oil bath heating. After the reaction was essentially complete, as evidenced by the rate of sodium chloride precipitation, about 100 cc. of toluene was added. The mixture was filtered to separate precipitated salt and the organic layer separated and washed thoroughly with cold water. After drying and separation of unreacted starting material to a B. P. of 15° C., the low boiling nitrile fraction was collected from 35° C. to about 55° C. Redistillation yielded perfluoroallyl cyanide ($CF_2$=$CFCF_2CN$), B. P. 43° C. to 48° C. (uncorrected), and a higher B. P. residue. This product was unsaturated to potassium permanganate in acetone and added bromine when reacted in a sealed tube in the presence of ultra-violet light. Dioxane was also found to be a suitable solvent for the reaction when substituted for the above-mentioned tertiary butyl alcohol.

2,3-dichloroperfluoropropene-1

was reacted similarly to $CF_2=CFCF_2Cl$ to produce corresponding products.

Since many embodiments might be made of the present invention and since many changes might be made in the embodiment described, it is to be understood that the foregoing description is to be interpreted as illustrative only and not in a limiting sense.

I claim:

1. A process for the allylic replacement of an unsaturated perhalocarbon which comprises: reacting a perhalofluoroallyl halide having at least 3 carbon atoms per molecule and an allylic halogen atom selected from the group consisting of chlorine, bromine and iodine with a metal salt which is capable of releasing a negative ion in solution different from said allylic halogen atom and selected from the group consisting of metal alcoholates, iodides, cyanides and nitrates in a solvent selected from the group consisting of water and a water-soluble compound, whereby said allylic halogen atom is replaced with the negative ion of the metal salt to produce a reaction mass comprising a substituted perhalofluoroallyl compound containing the negative ion of said metal salt; and recovering said perhalofluoroallyl compound from said reaction mass.

2. The process of claim 1 wherein said metal salt is a cyanide.

3. The process of claim 1 wherein said metal salt is a nitrate.

4. The process of claim 1 wherein said metal salt is an iodide.

5. The process of claim 1 wherein said metal salt is an alcoholate.

6. The process of claim 1 wherein said solvent is an alcohol.

7. The process of claim 1 wherein said solvent is a ketone.

8. The process of claim 1 wherein said solvent is an ether.

9. A process for the allylic replacement of an unsaturated perhalocarbon which comprises: reacting a perhalofluoroallyl halide having at least 3 carbon atoms per molecule and an allylic halogen atom selected from the group consisting of chlorine, bromine and iodine with a metal salt which is capable of releasing a negative ion in solution different from said allylic halogen atom and selected from the group consisting of metal alcoholates, iodides, cyanides and nitrates in a solvent selected from the group consisting of water and a water soluble compound at a temperature between about $-10°$ C. and about $200°$ C., whereby said allylic halogen atom is replaced with the negative ion of the metal salt to produce a reaction mass comprising a substituted perhalofluoroallyl compound containing the negative ion of said metal salt; and recovering said perhalofluoroallyl compound from said reaction mass.

10. A process for the allylic replacement of an unsaturated perhalocarbon which comprises: reacting a perhalofluoroallyl halide having at least 3 carbon atoms per molecule and an allylic halogen atom selected from the group consisting of chlorine, bromine and iodine with a metal salt which is capable of releasing a negative ion in solution different from said allylic halogen atom and selected from the group consisting of metal alcoholates, iodides, cyanides and nitrates in a solvent selected from the group consisting of water and a water-soluble compound at a temperature between about $5°$ C. and about $100°$ C., whereby said allylic halogen atom is replaced with the negative ion of the metal salt to produce a reaction mass comprising a substituted perhalofluoroallyl compound containing the negative ion of said metal salt; and recovering said perhalofluoroallyl compound from said reaction mass.

11. A process for the allylic replacement of an unsaturated perhalocarbon which comprises: reacting a perhalofluoroallyl halide having at least 3 carbon atoms per molecule and an allylic halogen atom selected from the group consisting of chlorine, bromine and iodine with a metal salt which is capable of releasing a negative ion in solution different from said allylic halogen atom and selected from the group consisting of metal alcoholates, iodides, cyanides and nitrates in a water-soluble solvent, whereby said allylic halogen atom is replaced with the negative ion of the metal salt to produce a reaction mass comprising a substituted perhalofluoroallyl compound containing the negative ion of said metal salt, solvent and a metallic allylic halogen salt precipitate; recovering said precipitate from said reaction mass; water-washing the remaining mixture, comprising said substituted perhalofluoroallyl compound and solvent, to dissolve said solvent and form an aqueous phase comprising said solvent and an organic phase comprising said substituted perhalofluoroallyl compound; and separating said phases.

12. A process for the allylic replacement of an unsaturated perhalocarbon which comprises: reacting a perhalofluoroallyl halide having at least 3 carbon atoms per molecule and an allylic halogen atom selected from the group consisting of chlorine, bromine and iodine with a metal salt which is capable of releasing a negative ion in solution different from said allylic halogen atom and selected from the group consisting of metal alcoholates, iodides, cyanides and nitrates in a water-soluble solvent at a temperature between about $-10°$ C. and about $200°$ C., whereby said allylic halogen atom is replaced with the negative ion of the metal salt to produce a reaction mass comprising a substituted perhalofluoroallyl compound containing the negative ion of said metal salt, solvent, a metallic allylic halogen salt precipitate and unreacted unsaturated perhalocarbon; recovering said precipitate from said reaction mass; water-washing the remaining mixture, comprising said substituted perhalofluoroallyl compound and solvent to dissolve said solvent and form an aqueous phase comprising said solvent and an organic phase comprising said substituted perhalofluoroallyl compound and unreacted unsaturated perhalocarbon; and separating said phases.

13. A process for the allylic replacement of an unsaturated perhalocarbon which comprises: reacting a perhalofluoroallyl halide having at least 3 carbon atoms per molecule and an allylic halogen atom selected from the group consisting of chlorine, bromine and iodine with a metal salt which is capable of releasing a negative ion in solution different from said allylic halogen atom and selected from the group consisting of metal alcoholates, iodides, cyanides and nitrates in a water-soluble solvent, whereby said allylic halogen atom is replaced with the negative ion of the metal salt to produce a reaction mass comprising a substituted perhalofluoroallyl compound containing the negative ion of said metal salt, solvent, a metallic allylic halogen salt precipitate and unreacted unsaturated perhalocarbon; recovering said precipitate from said reaction mass; water-washing the remaining mixture, comprising said substituted perhalofluoroallyl compound and solvent to dissolve said solvent and form an aqueous phase comprising said solvent and an organic phase comprising said substituted perhalofluoroallyl compound and unreacted unsaturated perhalocarbon; separating said phases; contacting said organic phase with an aqueous solution of sodium bisulfite having a concentration of at least 20% to form addition products with solvent present; and recovering said substituted perhalofluoroallyl compound from the addition products thus formed.

14. A process for the allylic replacement of an unsaturated perhalocarbon which comprises: reacting a perhalofluoroallyl halide having at least 3 carbon atoms per molecule and an allylic halogen atom selected from the group consisting of chlorine, bromine and iodine with a metal salt which is capable of releasing a negative ion in solution different from said allylic halogen atom and selected from the group consisting of metal alcoholates, iodides, cyanides and nitrates in a water-soluble solvent at a temperature between about 5° C. and about 100° C., whereby said allylic halogen atom is replaced with the negative ion of the metal salt to produce a reaction mass comprising a substituted perhalofluoroallyl compound containing the negative ion of said metal salt, solvent, a metallic allylic halogen salt precipitate and unreacted unsaturated perhalocarbon; recovering said precipitate from said reaction mass; water-washing the remaining mixture, comprising said substituted perhalofluoroallyl compound and solvent to dissolve said solvent and form an aqueous phase comprising said solvent and an organic phase comprising said substituted perhalofluoroallyl compound and unreacted unsaturated perhalocarbon; separating said phases; contacting said organic phase with an aqueous solution of sodium bisulfite having a concentration of at least 20% to form addition products with solvent present; and recovering said substituted perhalofluoroallyl compound from the addition products thus formed.

15. A process for the allylic replacement of $CF_2=CFCF_2Cl$ which comprises: reacting the aforesaid perhalocarbon with sodium methylate in a water-soluble solvent whereby $$CF_2=CFCF_2OCH_3$$

is produced.

16. A process for the allylic replacement of $CF_2=CFCF_2Cl$ which comprises: reacting the aforesaid perhalocarbon with sodium iodide in a water-soluble solvent whereby $CF_2=CFCF_2I$ is produced.

17. A process for the allylic replacement of $CF_2=CFCF_2Cl$ which comprises: reacting the aforesaid perhalocarbon with sodium cyanide in a water-soluble solvent whereby $CF_2=CFCF_2CN$ is produced.

18. A substituted perhalofluoroallyl compound containing a negative ion of a metal salt selected from the group consisting of metal alcoholates, iodides, cyanides and nitrates, said negative ion being attached to an allyl carbon atom.

19. A substituted perchlorofluoroallyl compound containing a negative ion of a metal salt selected from the group consisting of metal alcoholates, iodides, cyanides and nitrates, said negative ion being attached to an allyl carbon atom.

20. 3-methoxyperfluoropropene-1.
21. 3-iodoperfluoropropene-1.
22. 3-cyanoperfluoropropene-1.

WILLIAM T. MILLER.

References Cited in the file of this patent

UNITED STATES PATENTS

| Number | Name | Date |
|---|---|---|
| 2,097,155 | Groll et al. | Oct. 26, 1937 |
| 2,407,292 | Salzberg | Sept. 10, 1946 |
| 2,409,274 | Hanford et al. | Oct. 15, 1946 |
| 2,439,505 | Chaney | Apr. 13, 1948 |

FOREIGN PATENTS

| Number | Country | Date |
|---|---|---|
| 523,449 | Great Britain | July 15, 1940 |
| 525,136 | Great Britain | Aug. 22, 1940 |

OTHER REFERENCES

Fritsch, Beilstein (Handbuch, 4th Ed.), vol. I, page 200 (1918).

Lespieau, Beilstein (Handbuch, 4th Ed.), vol. II, page 408 (1921).

Boeseken et al., Beilstein (Handbuch, 4th Ed.), 2nd Supp., vol. II, page 187 (1929).

Adams et al., "Organic Reactions," vol. II, pages 50-61, 84 (1944).